United States Patent
Kawamura

(10) Patent No.: US 8,390,891 B2
(45) Date of Patent: *Mar. 5, 2013

(54) IMAGE PROCESSING APPARATUS AND METHOD FOR QUANTIZING PIXEL OF INTEREST BY ERROR DIFFUSION METHOD

(75) Inventor: Naoto Kawamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,293

(22) Filed: Mar. 29, 2012

(65) Prior Publication Data

US 2012/0182585 A1   Jul. 19, 2012

Related U.S. Application Data

(63) Continuation of application No. 12/412,713, filed on Mar. 27, 2009, now Pat. No. 8,169,664.

(30) Foreign Application Priority Data

Apr. 2, 2008   (JP) .................................. 2008-096559

(51) Int. Cl.
*H04N 1/40*   (2006.01)

(52) U.S. Cl. ........ 358/3.03; 358/1.9; 358/3.04; 358/3.05

(58) Field of Classification Search .................... None
See application file for complete search history.

(56) References Cited

U.S. PATENT DOCUMENTS

| | | | | |
|---|---|---|---|---|
| 5,898,796 A * | 4/1999 | Kumashiro | .................... | 382/252 |
| 6,160,921 A * | 12/2000 | Marcu | ........................... | 382/252 |
| 6,668,100 B1 * | 12/2003 | Kaburagi et al. | ............. | 382/299 |
| 6,671,068 B1 * | 12/2003 | Chang et al. | .................... | 358/1.9 |
| 6,750,983 B1 * | 6/2004 | Miyake | .......................... | 358/1.9 |
| 6,917,446 B2 * | 7/2005 | Tanaka et al. | ................. | 358/1.9 |
| 7,170,636 B2 * | 1/2007 | Kaburagi | ....................... | 358/1.9 |
| 7,194,130 B2 * | 3/2007 | Nishikawa | ................... | 382/167 |
| 7,265,874 B2 * | 9/2007 | Iwasaki et al. | ............... | 358/3.01 |
| 7,292,370 B2 * | 11/2007 | Iwaki | ............................. | 358/1.9 |
| 7,301,674 B2 * | 11/2007 | Feng et al. | .................... | 358/3.03 |
| 7,672,525 B2 * | 3/2010 | Ishikawa | ...................... | 382/252 |
| 7,889,394 B2 * | 2/2011 | Iwasaki et al. | ............... | 358/3.01 |
| 2002/0054308 A1 * | 5/2002 | Tanaka et al. | ................. | 358/1.9 |
| 2005/0195437 A1 * | 9/2005 | Couwenhoven et al. | ..... | 358/3.03 |
| 2008/0118170 A1 * | 5/2008 | Zhou et al. | .................... | 382/251 |

FOREIGN PATENT DOCUMENTS

JP   11-298734 A   10/1999

OTHER PUBLICATIONS

Japanese Office Action, without an English Translation, that issued in Japanese Patent Application No. 2008-096559.

* cited by examiner

*Primary Examiner* — Dung Tran

(74) *Attorney, Agent, or Firm* — Cowan, Liebowitz & Latman, P.C.

(57) ABSTRACT

A quantizing unit, error detector, error diffusion matrix, and adder quantize a pixel of interest of an input image by an error diffusion method. A calculation unit and gain adjuster calculate a value to be added to the pixel of interest with reference to quantized pixels. The adder adds the calculated value to the pixel of interest. A control unit controls the calculation of the gain adjuster.

6 Claims, 21 Drawing Sheets

F I G. 5
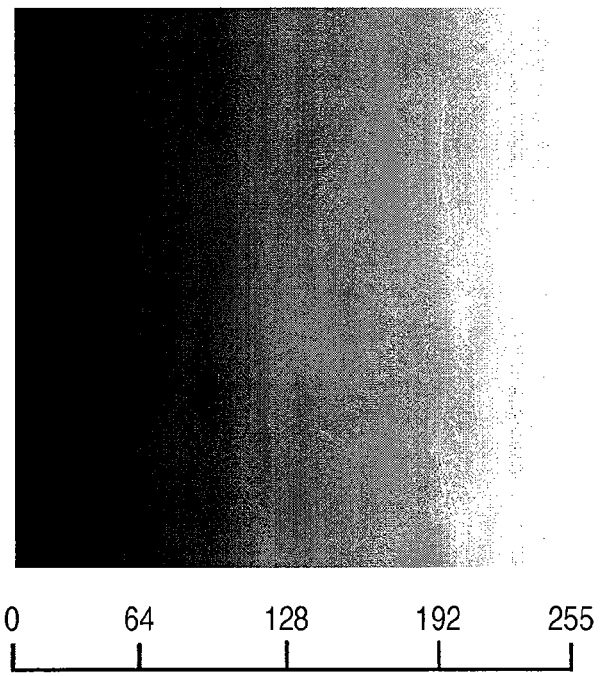
0  64  128  192  255
F I G. 6
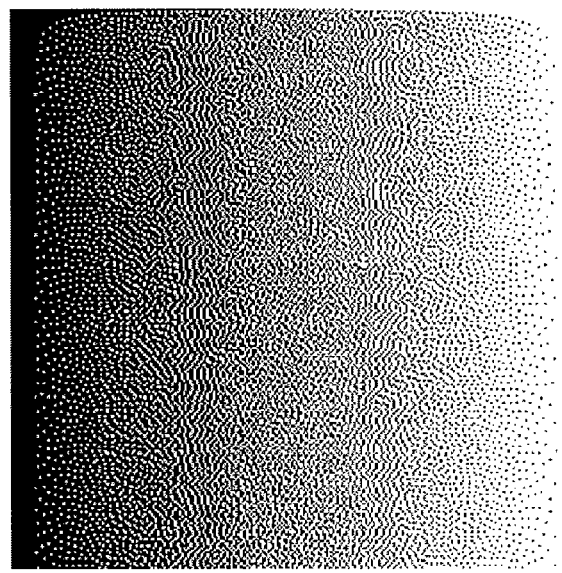
F I G. 7
| 0 | 0.5 |
|---|---|
| 0.5 | × |

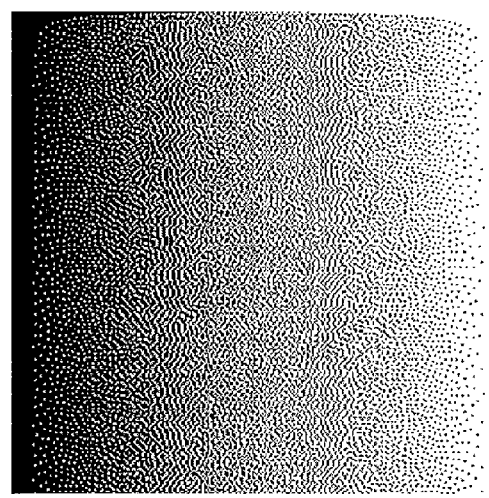
FIG. 8A  h=0
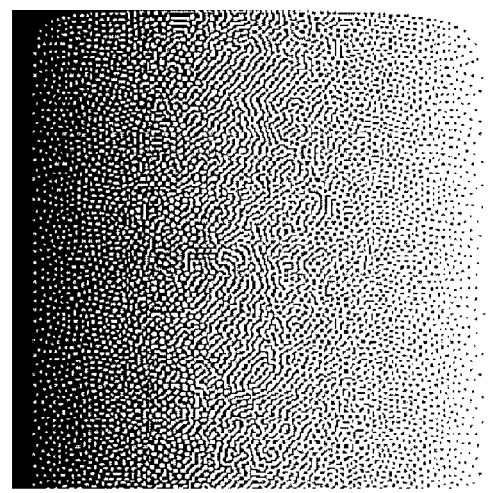
FIG. 8B  h=0.2
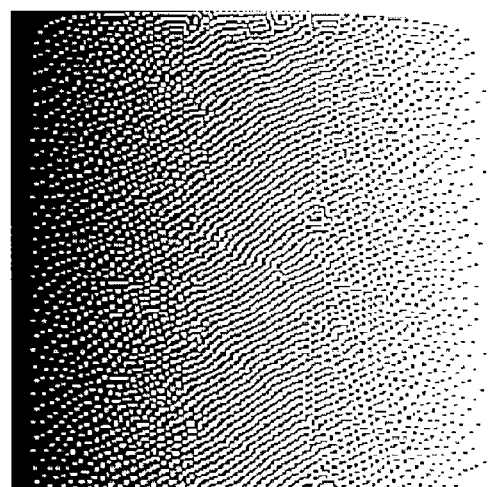
FIG. 8C  h=0.4

F I G. 21
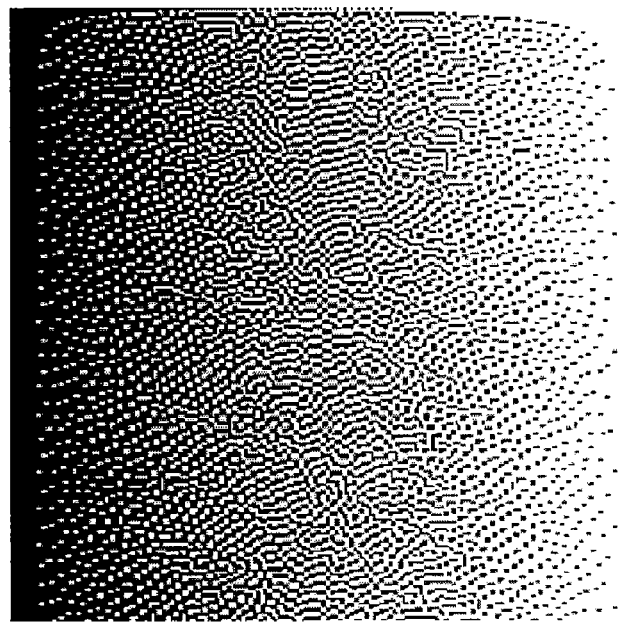
F I G. 22
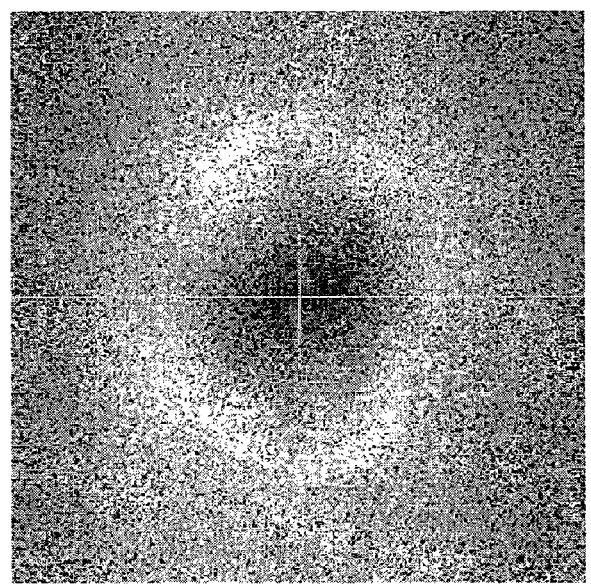

IMAGE PROCESSING APPARATUS AND METHOD FOR QUANTIZING PIXEL OF INTEREST BY ERROR DIFFUSION METHOD

CROSS-REFERENCE TO RELATED APPLICATION

This application is a continuation of application Ser. No. 12/412,713, filed Mar. 27, 2009, the entire disclosure of which is hereby incorporated by reference.

BACKGROUND OF THE INVENTION

1. Field of the Invention

The present invention relates to generation of a halftone screen and image processing using the halftone screen.

2. Description of the Related Art

[Error Diffusion Method]

Many printers such as ink-jet printers use a tone reproduction method based on an error diffusion method. The error diffusion method diffuses errors generated upon binarizing image data to pixels to be binarized. As a result, since the error diffusion method can preserve local densities, and provides excellent resolution and image sharpness, it can satisfactorily reproduce tonality.

FIG. 1 is a block diagram showing the signal processing sequence by the error diffusion method.

A binarizing unit 22 binarizes N-th input pixel data X[n] and outputs output pixel data Y[n]. An error detector 27 outputs an error (difference) generated upon binarization of the input pixel data X[n] as error data Ye[n]. An error diffusion matrix 25 diffuses the error data Ye[n] to non-binarized pixels (pixels to be binarized). An adder 21 adds diffusion data Xe[n] output from the error diffusion matrix 25 to pixel data of the non-binarized pixels to which an error is to be diffused.

FIG. 2 is a view showing the relationship between non-binarized pixels and diffusion intensities.

A pixel indicated by symbol X is a pixel of interest of binarization, x indicates the main scan direction of recording, and y indicates the sub-scan direction of recording. A hatched part above the pixel X of interest indicates binarized pixels X (those after binarization), and a part below the pixel of interest indicates non-binarized pixels. A numerical value given to each non-binarized pixel indicates a diffusive ratio, 7/48 of the error data Ye[n] are diffused to pixels which neighbor the pixel X of interest in the x- and y-directions, and 5/48 of the error data Ye[n] are diffused to obliquely lower right and lower left pixels of the pixel X of interest.

The spatial frequency characteristic of an image that has undergone such an error diffusion method indicates a so-called blue noise characteristic with low spectrum intensity in a low-frequency region. The blue noise characteristic generally has an excellent resolution characteristic since the spatial frequency characteristic extends up to a high-frequency region, and exhibits satisfactory tone reproducibility since the densities of the image are locally preserved due to re-use of errors generated by binarization. Therefore, the error diffusion method is popularly used in ink-jet printers. However, the error diffusion method is not practically used in an electrophotographic printer since a stable output cannot be obtained for the following reasons.

An electrophotographic printer has an exposure process that scans a light beam to remove electric charges from a uniformly charged surface layer of a photosensitive drum of, for example, an organic photoconductor (OPC) or amorphous silicon. This exposure process has nonlinearity. Complexity of electrophotography processes including development, transfer, and fixing also causes nonlinearity.

An interference occurs between print dots due to this nonlinear characteristic, thus considerably impairing tonality. For example, even when one independent dot is to be printed, it is difficult to record such dot. On the other hand, dots can be surely recorded in a cluster state of several dots. For this reason, the high-frequency characteristic lowers, and the tonality of a highlight region of an image deteriorates.

If the distance between dots is small, toner may move to connect dots. In the processes for recording dots by attaching ink drops onto a medium like in the ink-jet system, although a micro phenomenon between inks and a medium occurs, an interference between print dots hardly occurs, and dots can be surely recorded.

As described above, an electrophotographic printer is weak in variations of the spatial frequency of an image due to the nonlinearity of the electrophotography processes, and the error diffusion method cannot be applied to the electrophotographic printer intact.

[AM Modulation Method]

An electrophotographic printer uses a halftone formation method based on halftone dots or halftone screen using a cluster of dots (to be referred to as a cluster halftone screen hereinafter) upon reproducing an image having tonality in consideration of the nonlinearity. That is, printing has to be done by limiting the spatial frequency to a certain frequency region to lower high-frequency components.

An AM modulation method based on a halftone dot method makes a fundamental frequency constant depending on the grid intervals of halftone dots, and can obtain stable tone reproducibility even in the electrophotography system. On the negative side, in color printing, moiré is readily generated due to overlaying of toners of C, M, Y, and K colors.

In order to suppress moiré, different screen angles are set for respective color components to drive moiré beats generated between color components to a high-frequency region, thus visually obscuring moiré. For example, a Y screen angle is set to be 30°, and C, M, and K screen angles are set to be 0 or 60°, thereby suppressing moiré due to overlaying of color components.

In digital halftone processing, since the resolution of a digital image is discrete, arbitrary screen angles cannot be set. However, by selecting optimal and discrete screen angles for respective color components, moiré can be suppressed.

Even upon optimization by introducing screen angles, moiré beats are merely driven to a high-frequency region, and a unique pattern generated due to overlaying of color components still remains. This is a so-called Rosetta pattern and becomes an obstacle upon outputting an image with high image quality. In particular, upon outputting an image with high image quality, smooth image quality reproduction like a photograph of silver halide processes is required, and such a Rosetta pattern is a serious obstacle in meeting this requirement.

[FM Modulation Method]

As another approach, a method of reproducing tonality by an FM modulation method using error diffusion or blue noise mask is known. Since the FM modulation method can randomly lay out print dots, has satisfactory tonality, and is free from any moiré due to overlaying of color components, it is popularly adopted in an ink-jet system, thermal transfer system, and the like. However, with the FM modulation method, the dot intervals change, and cannot be freely controlled. For example, the dot interval is gradually reduced with increasing density value. For this reason, the spatial frequency characteristic extends up to a high frequency region, and the FM modulation method is directly influenced by the frequency characteristic of a printer. Therefore, the FM modulation method is not suited to an electrophotographic printer which is susceptible to the influence of spatial frequency variations.

[Green Noise Method]

As a method that can solve these problems, a green noise method is known. Details of the green noise method are described in Daniel L. Lau and Gonzalo R. Arce, "Modern Digital Halftoning (Signal Processing and Communications)", and U.S. Pat. No. 6,798,537. Note that "green noise" is named since the signal distribution frequency region is included in an intermediate frequency region with respect to white noise and blue noise.

FIG. 3 is a block diagram for explaining the signal processing sequence based on the green noise method.

A binarizing unit 22 binarizes N-th input pixel data X[n] and outputs output pixel data Y[n]. An error detector 27 outputs an error (difference) generated upon binarization of the input pixel data X[n] as error data Ye[n]. An error diffusion matrix 25 diffuses the error data Ye[n] to non-binarized pixels. An adder 21 adds diffusion data Xe[n] output from the error diffusion matrix 25 to pixel data of the non-binarized pixels to which an error is to be diffused. The processes described so far are the same as those in the error diffusion method shown in FIG. 1.

A calculation unit 23 acquires the values of a plurality of binarized pixels (to be referred to as reference pixels hereinafter), and applies a predetermined calculation to the acquired values. A gain adjuster 24 calculates data Xh[n] by multiplying data output from the calculation unit 23 by a predetermined gain h. An adder 26 adds the data Xh[n] to the pixel data output from the adder 21. The binarizing unit 22 inputs pixel data Xk[n] (feedback amount) to which the error and data Xh[n] are added.

FIG. 4 is a view showing the relationship between reference pixels and reference intensities.

As in FIG. 2, a pixel indicated by symbol X is a pixel of interest of binarization, x indicates the main scan direction of recording, and y indicates the sub-scan direction of recording. A hatched part above the pixel X of interest indicates binarized pixels. Binarized pixels indicated by a0, a1, a2, and a3 are reference pixels, and values a0, a1, a2, and a3 indicate reference intensities. Note that the reference pixels are binarized pixels in the vicinity of the pixel X of interest, and the image quality changes largely depending on selected reference pixels. A reference intensity ai=0 represents that data of the corresponding binarized pixel is not referred to, and the reference intensities are normalized assuming Σai=1. The output from the gain adjuster 24 is given by:

$$Xh[n] = h \times \Sigma_i (ai \times Yi) \quad (1)$$

where h is a gain coefficient, and

Yi is the value (0 or 255) of the i-th reference pixel.

[Binarization Result by Green Noise Method]

FIG. 5 is a view showing an image before binarization, and shows a grayscale image, the pixel values of which smoothly change from 0 (left end) to 255 (right end).

FIG. 6 is a view showing the binarization result of the grayscale image shown in FIG. 5 by the green noise method. In FIG. 6, error diffusion coefficients use those of Jarvis shown in FIG. 4, and the gain coefficient of the gain adjuster 24 is h=0.2. FIG. 7 is a view showing the relationship between reference pixels and reference intensities. In FIG. 7, binarized pixels which neighbor the pixel X of interest in the main scan direction and sub-scan direction are referred to at an intensity ratio 1:1. An image shown in FIG. 6 indicates an output image, the tonality of which is expressed by dots clustered by the green noise method.

FIGS. 8A to 8C are views showing changes of the output image when the gain coefficient h is changed upon binarizing the grayscale image shown in FIG. 5 by the green noise method.

FIG. 8A shows an output image example that does not input any feedback from binarized pixels by setting h=0. In this case, the output image is obtained by the error diffusion method using the error diffusion coefficients of Jarvis.

FIGS. 8B and 8C respectively show output image examples when h=0.2 and h=0.4. As the gain coefficient h becomes larger, the cluster sizes become larger, and an image apparently having high graininess is formed. In other words, as can be seen from FIGS. 8B and 8C, green noise shifts toward a low-frequency region as the gain coefficient h becomes larger. That is, the frequency characteristic of noise extended to a high-frequency region by the error diffusion method can be reduced to a spatial frequency region that can be stably handled by the electrophotography system by increasing the gain coefficient h. By adopting the green noise method, very close dots are controlled to form a cluster so as to avoid an unstable spatial frequency region of the electrophotography system, and image formation in a stable spatial frequency region can be made.

However, as can be seen from the image shown in FIG. 8C, dot patterns form parallel line-like patterns at an equal interval in a certain density region, and randomness of clustered dots (to be referred to as cluster dots) is lost.

FIG. 9 is a view showing a spectrum pattern by two-dimensional Fourier transformation of the image shown in FIG. 8C. White regions in FIG. 9 indicate spectra having high intensities. As can be seen from FIG. 9, a two-dimensional spectrum distribution does not have an isotropic ring pattern, but it exhibits strong spectra in a certain direction (in a direction from upper left to lower right in FIG. 9). This reflects the spectra of the parallel line-like patterns of the image shown in FIG. 8C.

FIG. 10 is a graph showing the spectral intensities of a section along the ordinate of the spectrum pattern shown in FIG. 9, which is slightly on the right side of the center. A pattern of spectral intensities shows asymmetry to have a zero frequency (at the position of 128 on the abscissa of FIG. 10) as the center.

Generation of the periodic parallel line-like patterns adversely affects moiré avoidance. When dots which are to be randomly distributed originally form periodic patterns in a certain density region, periodic patterns of other colors overlap on that density region, thus generating moiré. Screens of the FM modulation method aim at a high-image quality output free from any moiré, and generation of moiré poses a serious problem.

SUMMARY OF THE INVENTION

In one aspect, an image processing method comprising the steps of quantizing a pixel of interest of an input image by an error diffusion method; calculating a value to be added to the pixel of interest with reference to quantized pixels, and add the calculated value to the pixel of interest; and controlling the calculation of the calculating step.

According to the aspect, a halftone screen applicable to an electrophotographic printer can be generated. Also, a halftone screen that can suppress generation of moiré, and can obtain satisfactory tone reproduction can be generated.

Further features of the present invention will become apparent from the following description of exemplary embodiments with reference to the attached drawings.

BRIEF DESCRIPTION OF THE DRAWINGS

FIG. 5 is a view showing an image before binarization.

FIG. 6 is a view showing the binarization result of a grayscale image shown in FIG. 5 by the green noise method.

FIG. 7 is a view showing the relationship between reference pixels and reference intensities.

FIGS. 8A to 8C are views showing the binarization results of the grayscale image shown in FIG. 5 by the green noise method.

FIG. 21 is a view showing the binarization result of the grayscale image shown in FIG. 5 by a green noise method according to rule (3).

FIG. 22 is a view showing a spectrum pattern by two-dimensional Fourier transformation of a grayscale image shown in FIG. 21.

DESCRIPTION OF THE EMBODIMENTS

Image processing according to embodiments of the present invention will be described in detail hereinafter with reference to the drawings.

First Embodiment

[Apparatus Arrangement]

Figure 11:
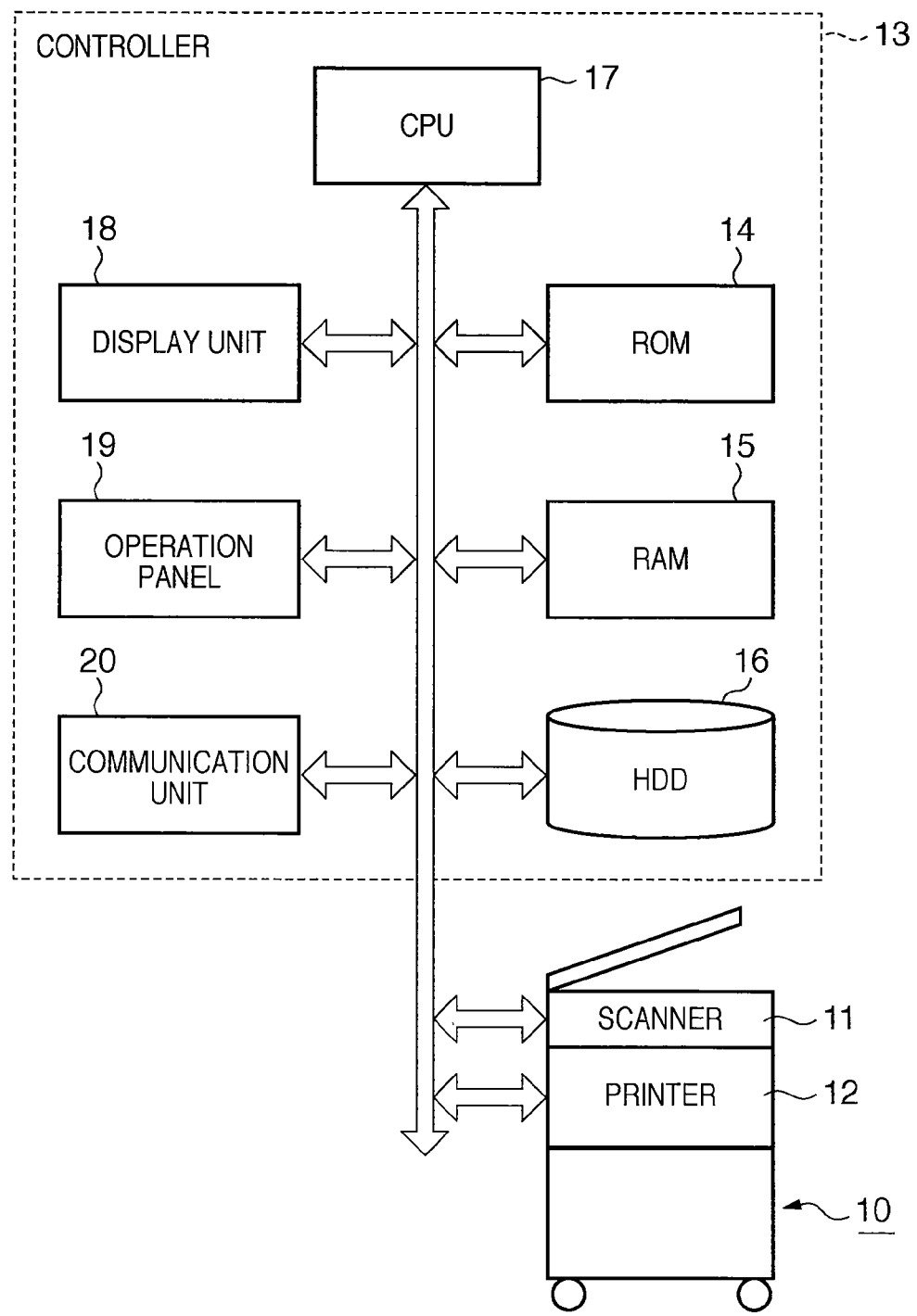
FIG. 11 is a block diagram showing the arrangement of an image processing apparatus according to an embodiment.

FIG. 11 is a block diagram showing the arrangement of an image processing apparatus according to an embodiment.

Functions of a piece of multi-functional peripheral equipment (MFP) 10 having a scanner 11 and electrophotographic printer 12 are controlled by a controller 13 incorporated in the MFP 10.

A microprocessor (CPU) 17 of the controller 13 executes an operating system (OS) and various programs stored in a read-only memory (ROM) 14 and hard disk drive (HDD) 16 using a random access memory (RAM) 15 as a work memory. The HDD 16 stores programs such as a control program and image processing program, and image data.

The CPU 17 displays a user interface on a display unit 18, and inputs user instructions from software keys on the display unit 18 and a keyboard of an operation panel 19. For example, when a user instruction indicates a copy instruction, the CPU 17 controls the printer 12 to print a document image scanned by the scanner 11 (copy function).

A communication unit 20 is a communication interface, which connects a public line or network (not shown). When a user instruction indicates a facsimile (FAX) transmission instruction, the CPU 17 controls the communication unit 20 to transmit, via FAX, a document image scanned by the scanner 11 to a destination designated by the user (FAX function). When a user instruction indicates a push-scan instruction, the CPU 17 controls the communication unit 20 to transmit a document image scanned by the scanner 11 to a designated server (push-scan function). When the communication unit 20 receives a FAX image, the CPU 17 controls the printer 12 to print the received image (FAX function). When the communication unit 20 receives a print job, the CPU 17 controls the printer 12 to print an image in accordance with the print job (printer function). When the communication unit 20 receives a pull-scan job, the CPU 17 controls the communication unit 20 to transmit a document image scanned by the scanner 11 to a designated server or client in accordance with the scan job (pull-scan function).

Dot Generator

Figure 12:
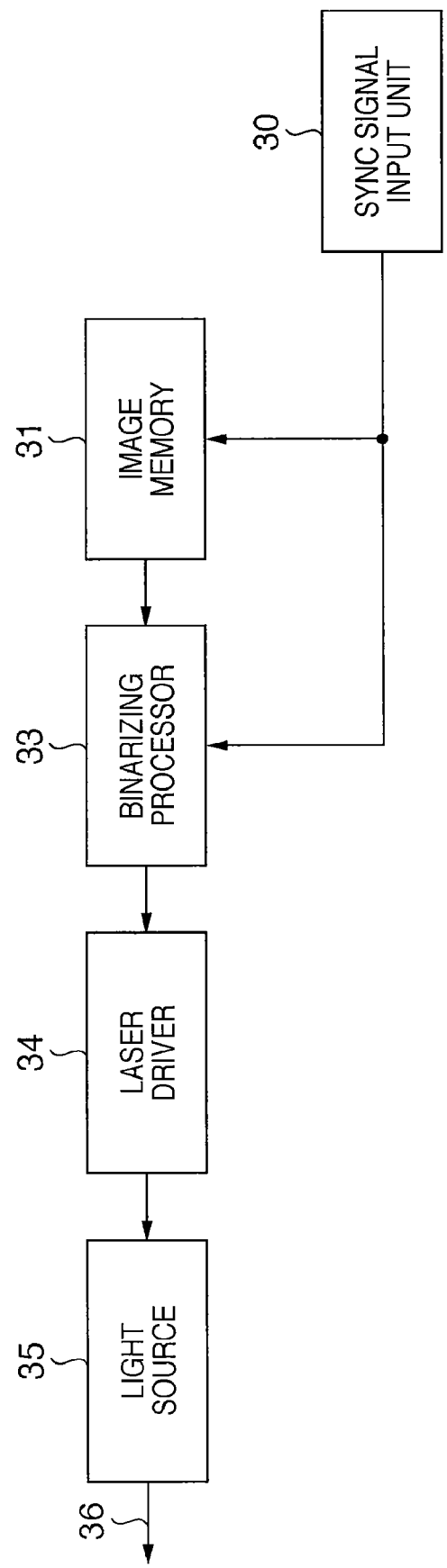
FIG. 12 is a block diagram showing an example of the arrangement of a dot generator which generates a cluster halftone screen.

FIG. 12 is a block diagram showing the arrangement of a dot generator which generates a cluster halftone screen. Note that the dot generator is configured as a part of the controller 13.

A sync signal input unit 30 inputs, as sync signals, a horizontal sync signal Hsync indicating the scan timing of one line, a vertical sync signal Vsync indicating the scan timing of one page, and pixel clocks Vclock from the printer 12. These sync signals are sequentially input to an image memory 31 allocated on the RAM 15, and image data corresponding to the scan position of a photosensitive drum (not shown) is output.

The sync signals are also sequentially input to a binarizing processor 33. The binarizing processor 33 binarizes image data input from the image memory 31.

A laser driver 34 controls emission of a beam light source 35 by driving the beam light source 35 in accordance with a binary signal output from the binarizing processor 33. For example, when a binary signal is '1', the laser driver 34 controls the beam light source 35 to output a light beam 36 (laser ON); when it is '0', the laser driver 34 controls the beam light source 35 not to output any light beam 36 (laser OFF).

A detailed description of electrophotography processes will not be given. The light beam scans a photosensitive drum of the printer 12 to form (optically expose) an electrostatic latent image on the photosensitive drum. The electrostatic latent image is developed by toner, and is transferred as a toner image onto a print sheet. Upon formation of a color image, toner images of respective color components are multi-transferred onto a print sheet. After that, the print sheet is fed to a fixing device which fixes the toner image on the print sheet, and is then discharged outside the printer 12.

[Binarizing Processor]

Figure 13:
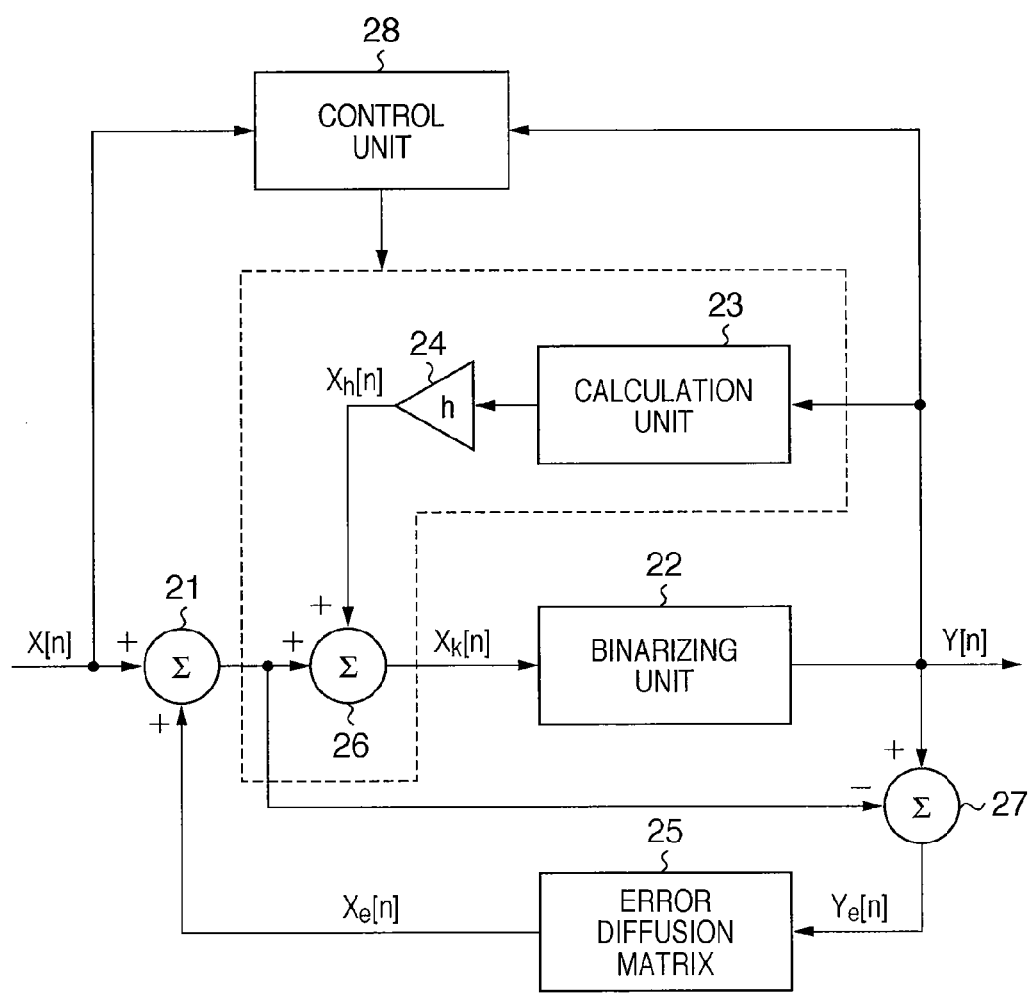
FIG. 13 is a block diagram showing the basic arrangement of a binarizing processor.

FIG. 13 is a block diagram showing the basic arrangement of the binarizing processor 33. Note that the same reference numerals in FIG. 13 denote the same components shown in FIGS. 1 and 3, and a repetitive description thereof will often be avoided.

The binarizing processor 33 of this embodiment roughly includes a diffusion unit which diffuses a binarization error to a plurality of non-binarized pixels, an addition unit which adds data of binarized pixels to a pixel of interest, and a control unit which controls the addition unit.

Figure 1:
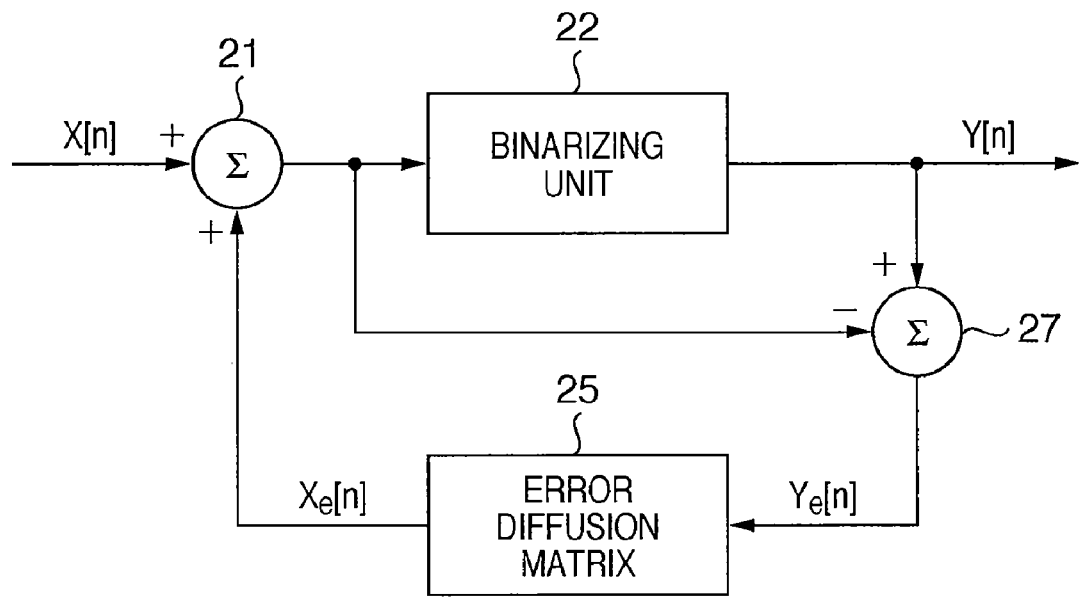
FIG. 1 is a block diagram showing the signal processing sequence based on an error diffusion method.
Figure 2:
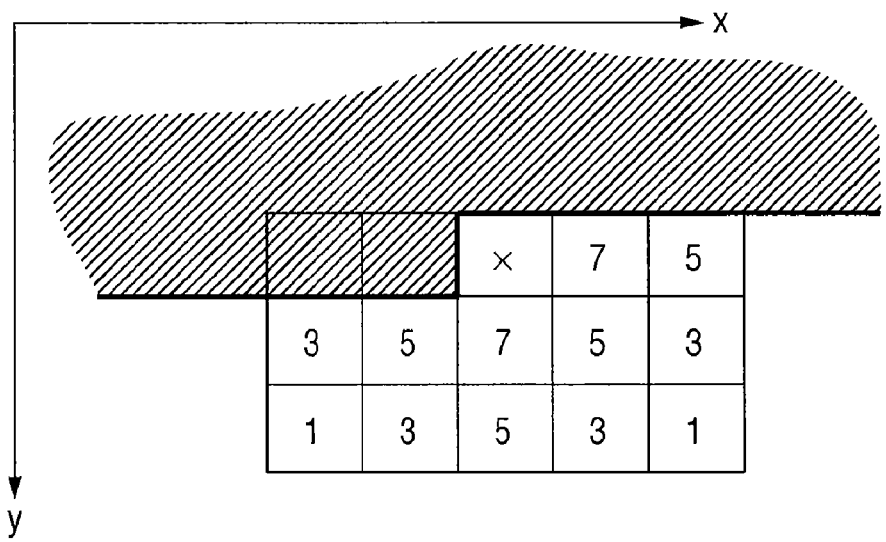
FIG. 2 is a view showing the relationship between non-binarized pixels and distribution intensities.

The diffusion unit corresponds to the binarizing unit 22, error detector 27, error diffusion matrix 25, and adder 21 described using FIG. 1.

Figure 3:
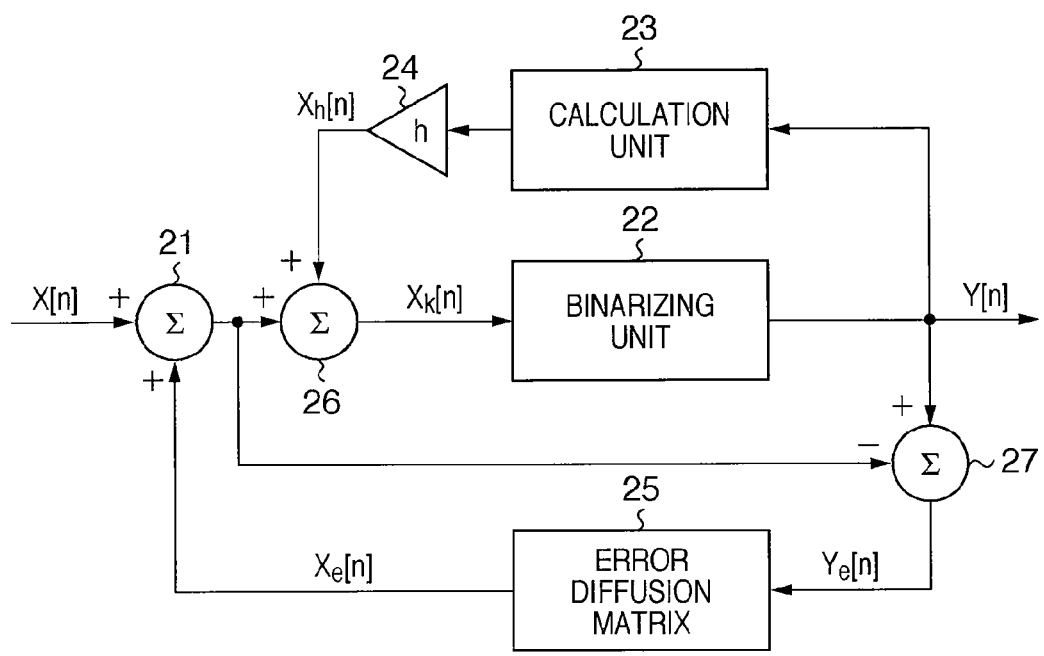
FIG. 3 is a block diagram for explaining the signal processing sequence based on a green noise method.

The addition unit corresponds to the calculation unit 23, gain adjuster 24, and adder 26 described using FIG. 3.

The control unit corresponds to a control unit 28 which controls the addition unit based on input pixel data X[n] and/or output pixel data Y[n].

Details of Control Unit

Figure 14:
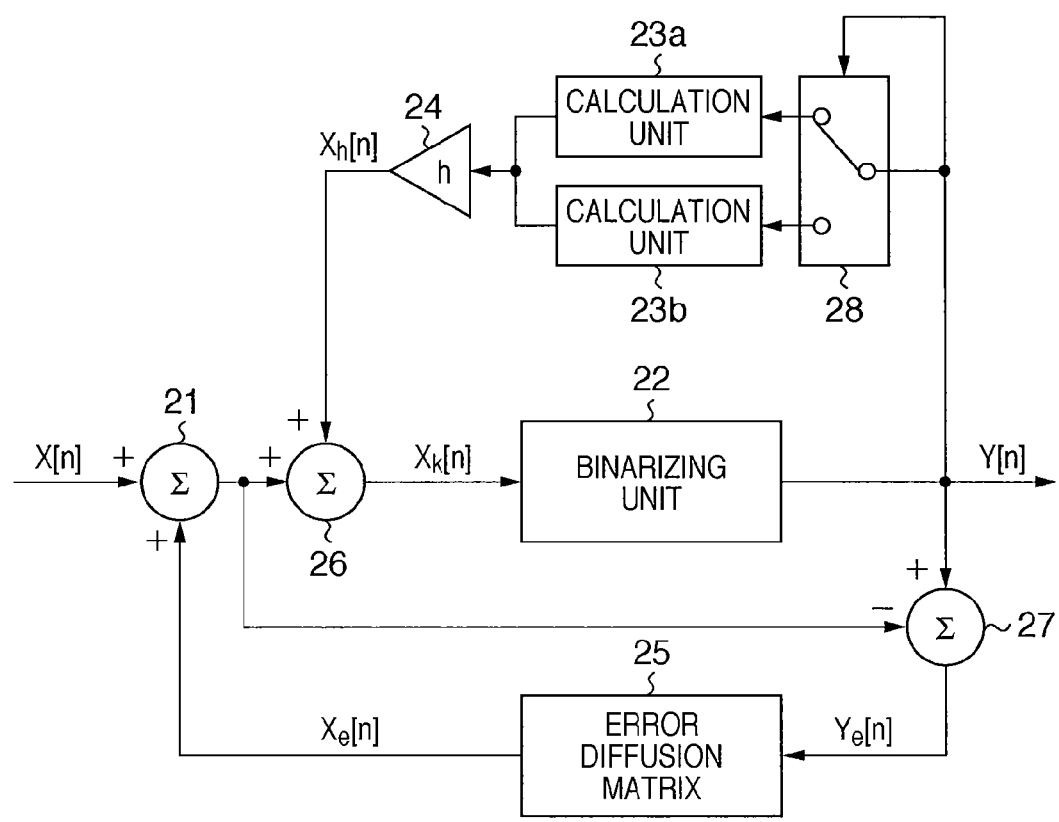
FIG. 14 is a block diagram showing the arrangement of the binarizing processor.

FIG. 14 is a block diagram showing the arrangement of the binarizing processor 33.

The control unit 28 adaptively selects one of calculation units 23a and 23b using different reference pixels based on data of a plurality of binarized pixels, and inputs the data of the plurality of binarized pixels to the selected calculation unit 23a or 23b.

Figure 4:
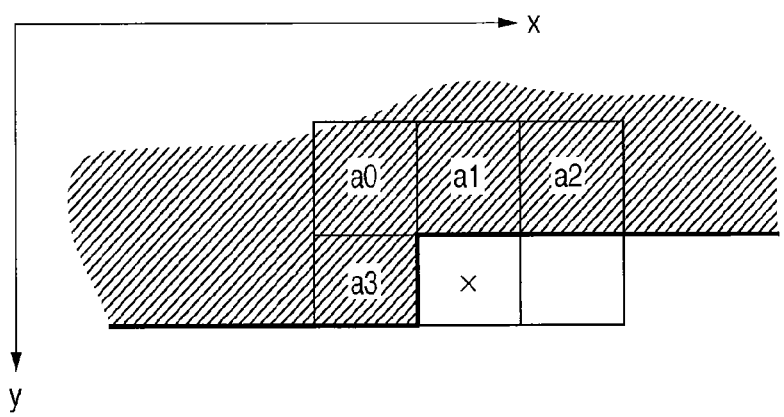
FIG. 4 is a view showing the relationship between reference pixels and reference intensities.
Figure 15:
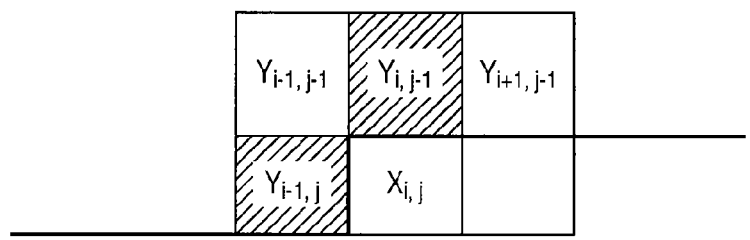
FIG. 15 is a view showing the relationship between a pixel of interest and reference pixels.

A feedback amount Xk[n] from the binarized pixels when the reference pixels and reference intensities a0, a1, a2, and a3 shown in FIG. 4 are used is given by:

$$Xk[i,j] = h \cdot \sum_p (a_p \times Y_p) \quad (2)$$
$$= h(a0 \cdot Y0 + a1 \cdot Y1 + a2 \cdot Y2 + a3 \cdot Y3)$$

where [i, j] indicates the spatial coordinates of a pixel X[n] of interest (see FIG. 15),
Y0=Y[i−1, j−1],
Y1=Y[i, j−1],
Y2=Y[i+1, j−1],
Y3=Y[i−1, j], and
Σai=1.

Assume that the calculation units 23a and 23b have, for example, different reference intensities as follows:
Calculation unit 23a: C1(a0, a1, a2, a3)=C1(0, 1, 0, 1)
Calculation unit 23b: C2(a0, a1, a2, a3)=C2(1, 1, 0, 1)

The control unit 28 selects the calculation unit 23a or 23b according to, for example, following rule (3):

if Y3==Y1 (i.e., Y[i−1, j]==Y[i, j−1]) select the calculation unit 23b (C2); else select the calculation unit 23a (C1); (3)

Figure 16:
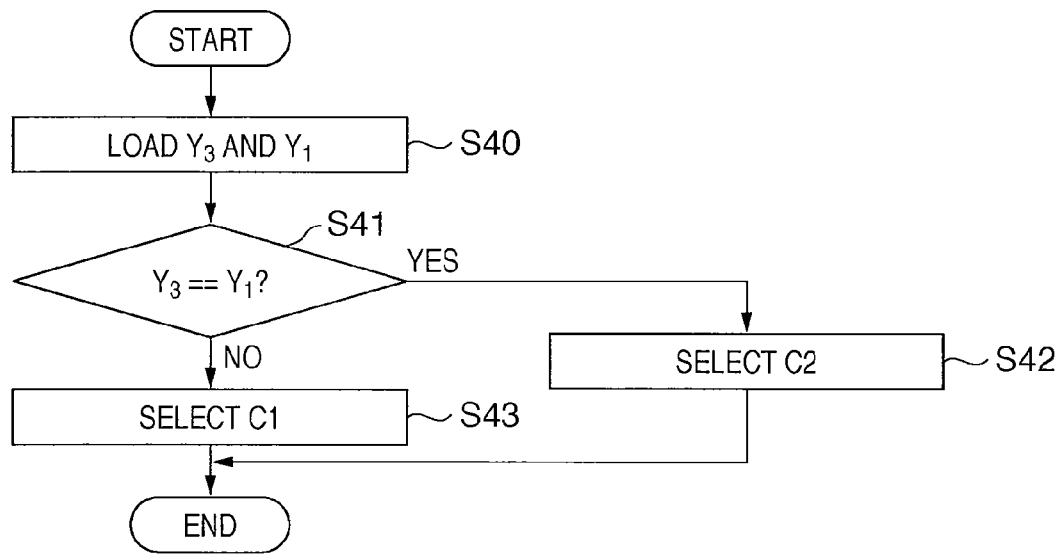
FIG. 16 is a flowchart showing selection processing of calculation units by a control unit.

FIG. 16 is a flowchart showing the selection processing of the calculation unit 23a or 23b by the control unit 28.

The control unit 28 loads data Y3 and Y1 of binarized pixels (S40), and compares the data Y3 and Y1 (S41). If Y3==Y1, the control unit 28 selects the calculation unit 23b (C2) (S42); if Y3≠Y1, it selects the calculation unit 23a (C1) (S43). In other words, if both a pixel above a pixel of interest and a pixel immediately before the pixel of interest are painted in white or black by binarization, the calculation unit 23b (C2) is selected; if these pixels form a combination of black and white, the calculation unit 23a (C1) is selected.

Control Algorithm

Figure 17:
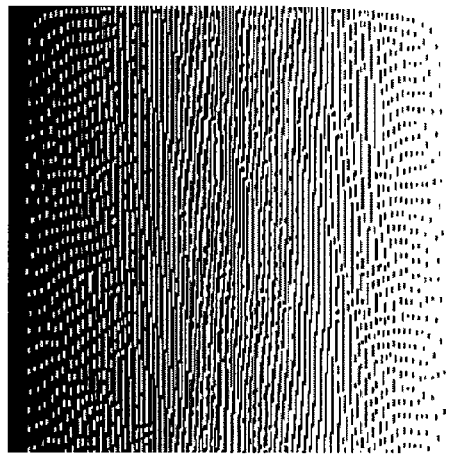
FIGS. 17 to 20 are views showing the binarization results of the grayscale image shown in FIG. 5 by the green noise method.

FIG. 17 is a view showing the binarization result of the grayscale image shown in FIG. 5 by the green noise method, and shows an example in which only a binarized pixel above the pixel of interest is used as a reference pixel. In this case, dot patterns of an output image mainly include patterns connected in the vertical direction.

Data of the binarized pixel is 0 or 255, and a value obtained by multiplying that data by h (0 or 255×h) is added to data of the pixel of interest. As a result, binarization of the pixel of interest is more likely to copy the characteristic of the reference pixel. When the reference pixel is white, the pixel of interest is more likely to be binarized to white; when it is black, the pixel of interest is more likely to be binarized to black. Therefore, the dot patterns of the output image mainly include patterns which are connected in the direction of reference pixels (the vertical direction in this example).

Figure 18:
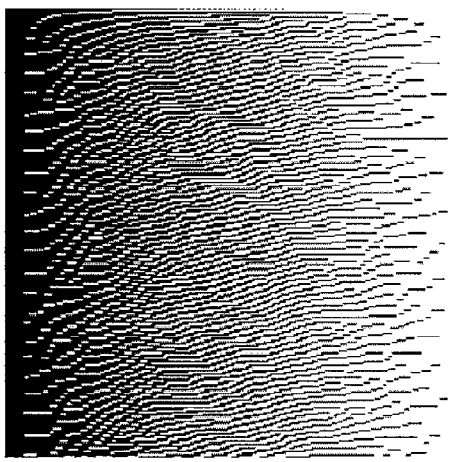

The same applies to the horizontal direction. FIG. 18 is a view showing the binarization result of the grayscale image shown in FIG. 5 by the green noise method, and shows an example in which only a left-neighboring binarized pixel of the pixel of interest is used as a reference pixel. In this case, dot patterns of an output image mainly include patterns which are connected in the horizontal direction.

In this way, in the green noise method, the position of a reference pixel largely influences the characteristic of dot patterns. The output images shown in FIGS. 17 and 18 dare to use only one reference pixel and have poor image quality.

Figure 19:
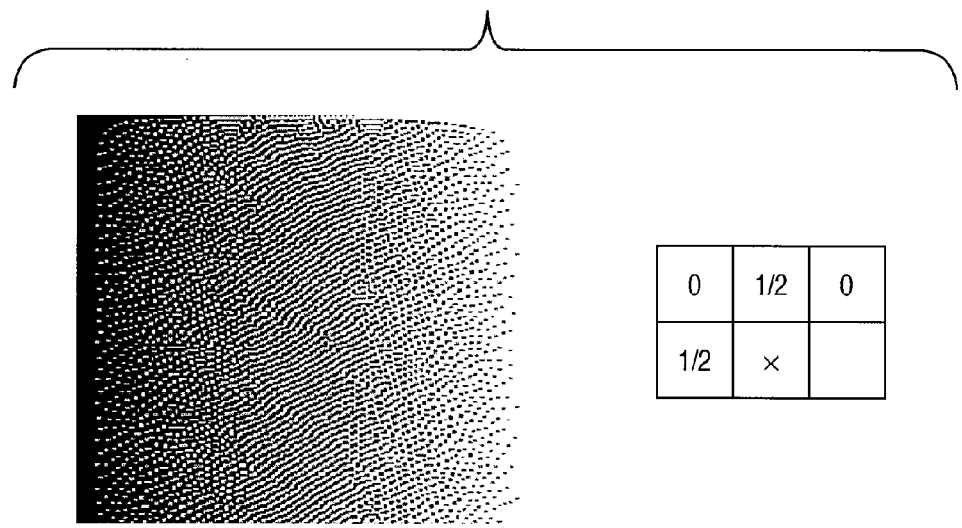

FIG. 19 is a view showing the binarization result of the grayscale image shown in FIG. 5 by the green noise method, and shows an output image obtained when two binarized pixels, that is, left and upper binarized pixels of the pixel of interest are used as reference pixels, that is, the calculation unit 23a (C1) is selected. In this case, parallel line-like patterns are obliquely generated in a central portion (near a middle density value=128) of the output image shown in FIG. 19. That is, since the two reference pixels are arranged from lower left to upper right, parallel line-like patterns having a slope directed from lower right to upper left (to be referred to as right 45° hereinafter) appears in an intermediate density region of the output image.

Figure 20:
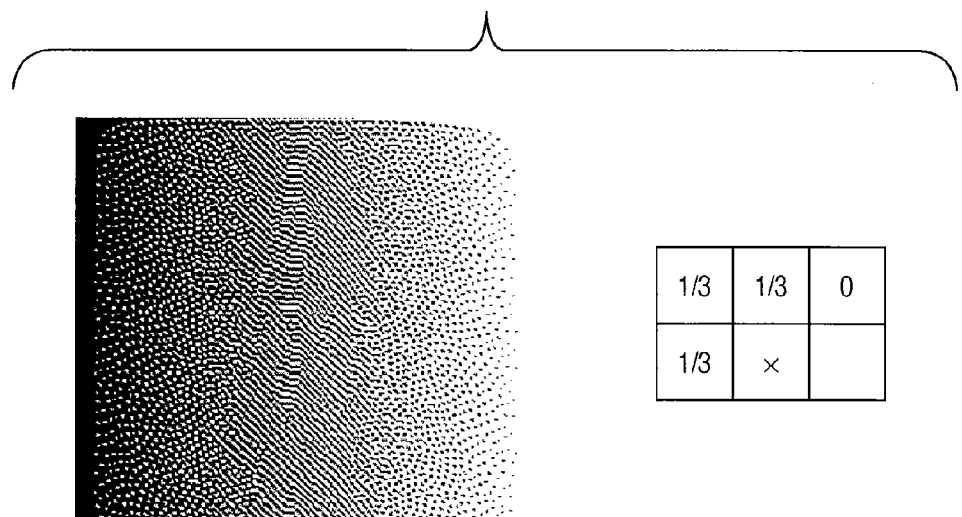

FIG. 20 is a view showing the binarization result of the grayscale image shown in FIG. 5 by the green noise method, and shows an output image obtained when three binarized pixels, that is, left, upper, and obliquely upper left binarized pixels of the pixel of interest are used as reference pixels, that is, the calculation unit 23b (C2) is selected. In this case, since the three reference pixels have a barycenter in the upper left direction, parallel line-like patterns having a slope directed from upper left to lower right (to be referred to as left 45° hereinafter) appear in an intermediate density region of the output image.

As described above, the control unit 28 switches the calculation units 23a and 23b to adaptively switch the combinations of reference pixels. The following switching control algorithm is effective.

refer to data of binarized pixels;

if(right-45° parallel line-like patterns exist) select reference pixels used to generate left-45° parallel line-like patterns; else select reference pixels used to generate right-45° parallel line-like patterns; (4)

In order to determine the right-45° parallel line-like patterns, the necessary condition is that data of the binarized pixels Y3 (Y[i−1, i]) and Y1 (Y[i, j−1]) are both 255 or 0. That is, rule (3) described above and the sequence shown in FIG. 16 satisfy control algorithm (4) described above.

FIG. 21 is a view showing the binarization result of the grayscale image shown in FIG. 5 by the green noise method according to rule (3) using the gain coefficient h=0.4. In an output image shown in FIG. 21, parallel line-like patterns in the intermediate density region disappear and randomness of cluster dots is increased compared to the output image which has the same gain coefficient h=0.4 and is shown in FIG. 8C.

Figure 9:
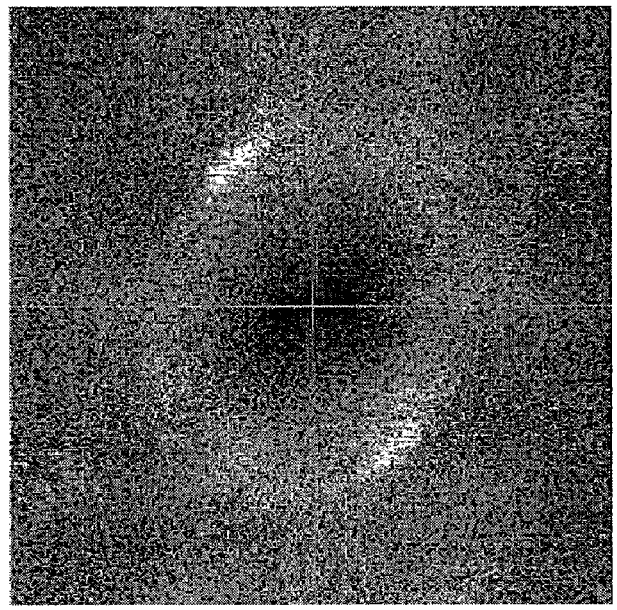
FIG. 9 is a view showing a spectrum pattern by two-dimensional Fourier transformation of a grayscale image shown in FIG. 8C.
Figure 10:
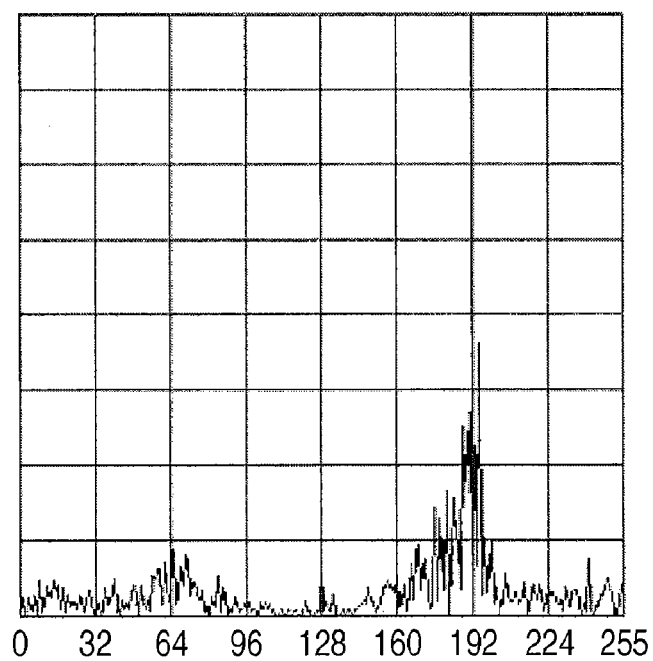
FIG. 10 is a graph showing the spectral intensities of a section along the ordinate of the spectrum pattern shown in FIG. 9, which is slightly on the right side of the center.
Figure 23:
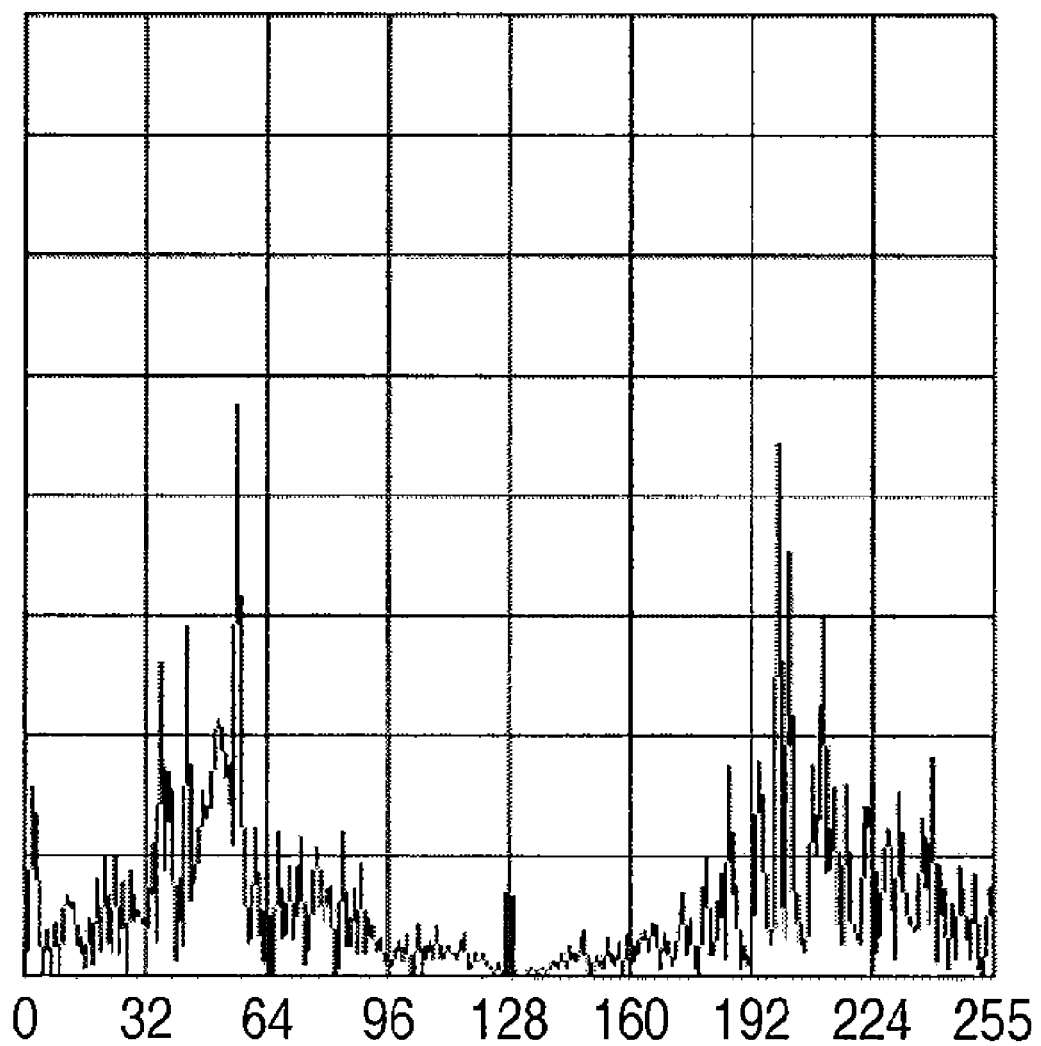
FIG. 23 is a graph showing the spectral intensities of a section along the ordinate of the spectrum pattern shown in FIG. 22, which is slightly on the right side of the center.

FIG. 22 is a view showing a spectrum pattern by two-dimensional Fourier transformation of the grayscale image shown in FIG. 21. FIG. 23 is a graph showing the spectral intensities of a section along the ordinate of the spectrum pattern shown in FIG. 22, which is slightly on the right side of the center. As can be seen from a comparison with the spectrum pattern (FIGS. 9 and 10) of the image shown in FIG. 8C, the green noise characteristic of the image shown in FIG. 21 is distributed in roughly a ring pattern, and its section is nearly symmetrical about the center.

FIGS. 24A to 24D are views showing the binarization results of a photo image by the green noise method. A normal green noise method is applied in FIGS. 24A and 24B, and the green noise method according to rule (3) is applied in FIGS. 24C and 24D. Note that the gain coefficient h is 0.2 in FIGS. 24A and 24C, and is 0.4 in FIGS. 24B and 24D.

Figure 24A:
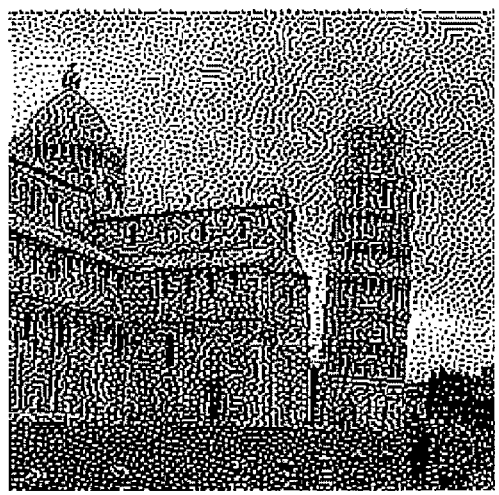
FIGS. 24A to 24D are views showing the binarization results of a photo image by the green noise method.
Figure 24B:
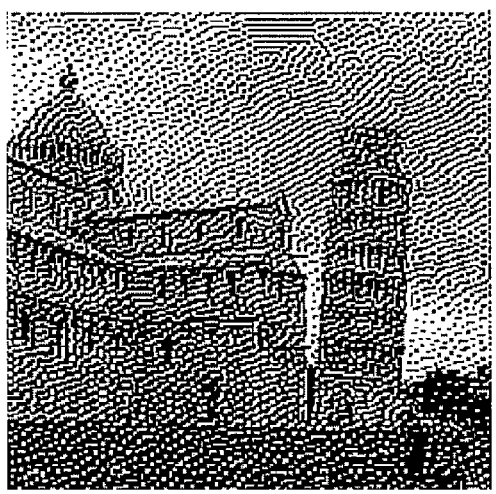
Figure 24C:
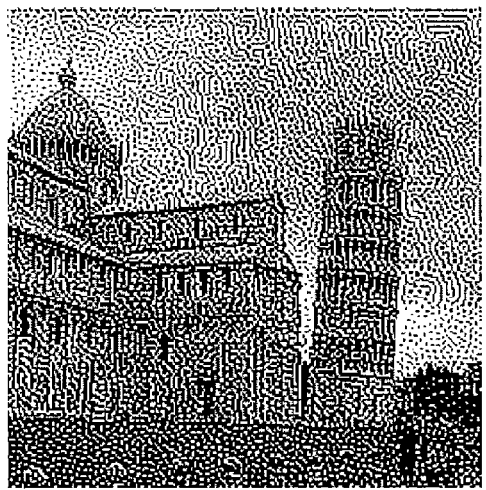
Figure 24D:
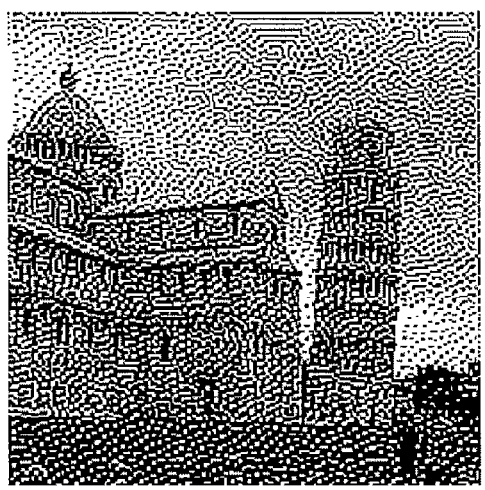

When the gain coefficient is h=0.2, the difference between the normal green noise method and the green noise method according to rule (3) is slight. However, when the gain coefficient is h=0.4, right-45° parallel line-like patterns are observed in the normal green noise method (FIG. 24B), but right-45° parallel line-like patterns disappear in the green noise method according to rule (3) (FIG. 24D).

In this way, by adaptively controlling the addition unit which adds data of binarized pixels to a pixel of interest, patterns of cluster dots can be controlled, thus obtaining a high-quality output image which suffers less generation of moiré.

Second Embodiment

Image processing according to the second embodiment of the present invention will be described below. Note that the same reference numerals in the second embodiment denote the same components as in the first embodiment, and a detailed description thereof will not be repeated.

The output image (h=0.4) shown in FIG. 21 of the first embodiment includes laterally-faced parallel line-like patterns in the intermediate density region albeit only slightly. On the other hand, when h=0.2 is set (although not shown), no parallel line-like patterns are generated, and random cluster patterns appear. Hence, in the second embodiment, the gain coefficient h is controlled for image data in the intermediate density region (or in accordance with the values of image data), thus further improving image quality.

Figure 25:
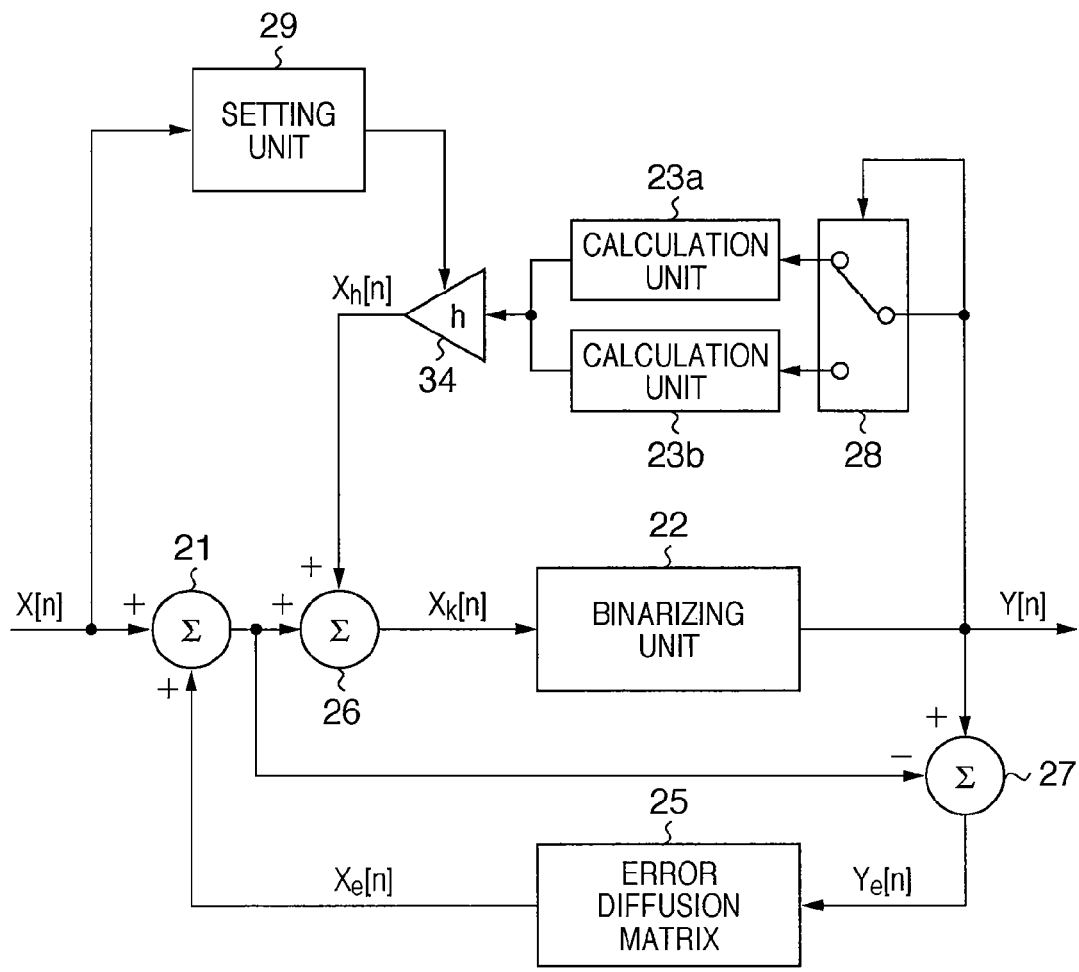
FIG. 25 is a block diagram showing the arrangement of a binarizing processor according to the second embodiment.

FIG. 25 is a block diagram showing the arrangement of a binarizing processor 33 according to the second embodiment.

A setting unit 29 inputs input pixel data X[n], and sets the gain coefficient h in accordance with data of a pixel of interest.

Figure 26:
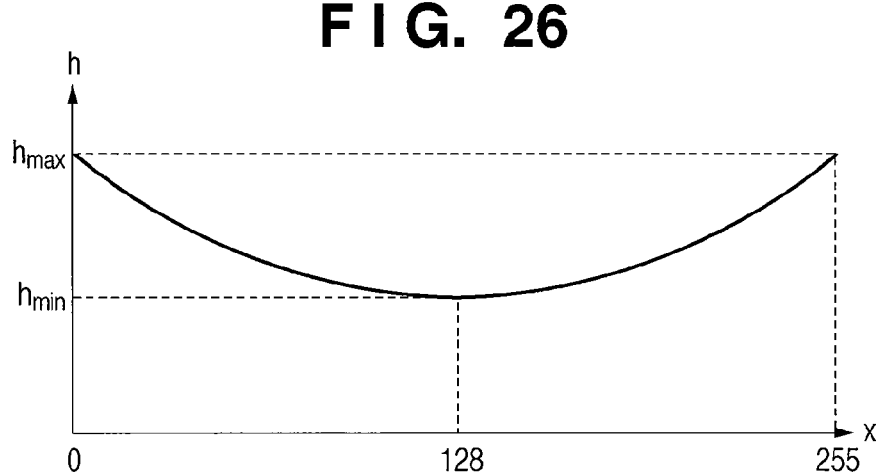
FIG. 26 is a graph showing the relationship between data of a pixel of interest and a gain coefficient h.

FIG. 26 is a graph showing the relationship between the data of the pixel of interest and the gain coefficient h. The image quality is improved by setting the gain coefficient h for data 128 to be a minimum value hmin. The gain coefficient h with respect to data X of the pixel of interest is expressed by a quadratic function given by:

$$h = (hmax - hmin) \cdot (X - 128)^2 / 128^2 + hmin \quad (5)$$

In this way, the gain coefficient h ranges from hmin to hmax in accordance with the data X of the pixel of interest, and assumes the minimum value hmin at X=128. Note that the example using the quadratic function as equation (5) has been described. When the following function is used to reduce the ratio of change in gain coefficient h at X=0 and 255, the gain coefficient can be changed more smoothly, and a high-quality image can be obtained.

$$h = (hmax - hmin) \cdot \cos^2(\pi X / 255) + hmin \quad (6)$$

Figure 27:
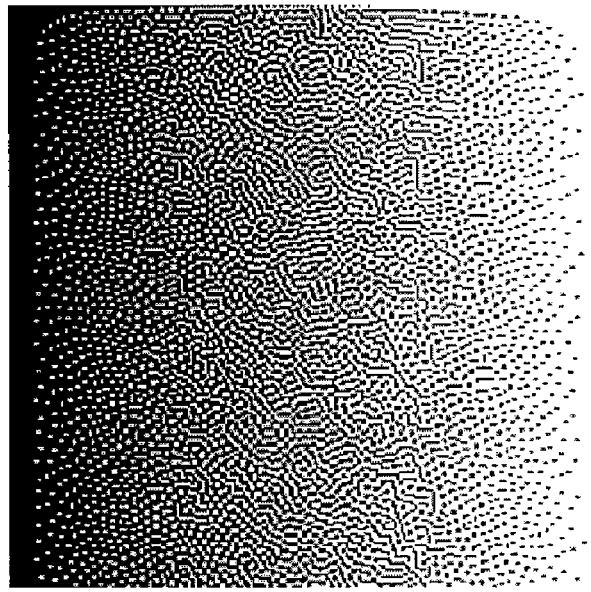
FIG. 27 is a view showing the binarization result of the grayscale image shown in FIG. 5 using a variable gain coefficient h.
Figure 28:
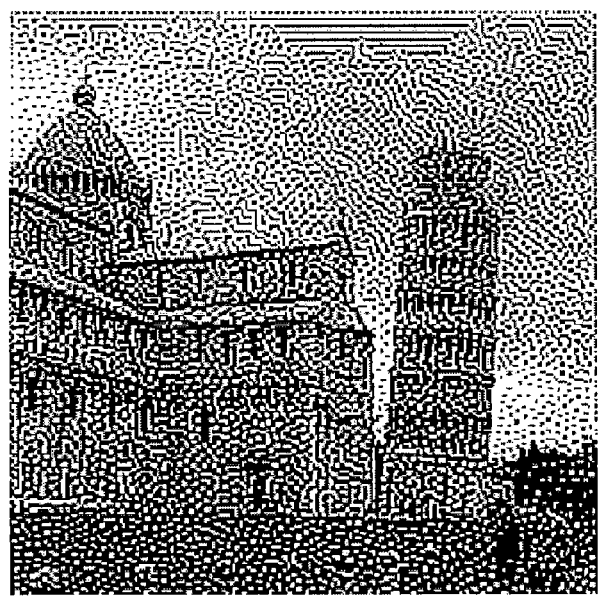
FIG. 28 is a view showing the binarization result of a photo image by a green noise method according to the second embodiment.

FIG. 27 is a view showing the binarization result of the grayscale image shown in FIG. 5 by the green noise method according to rule (3) using a variable gain coefficient h. Compared to the output image shown in FIG. 21, parallel line-like patterns in the intermediate density region disappear, and the image quality further improves. FIG. 28 is a view showing the binarization result of a photo image by the green noise method of the second embodiment, and a satisfactory output image can be obtained even for the photo image.

Third Embodiment

Image processing according to the third embodiment of the present invention will be described below. Note that the same reference numerals in the third embodiment denote the same components as in the first and second embodiments, and a detailed description thereof will not be repeated.

Figure 29:
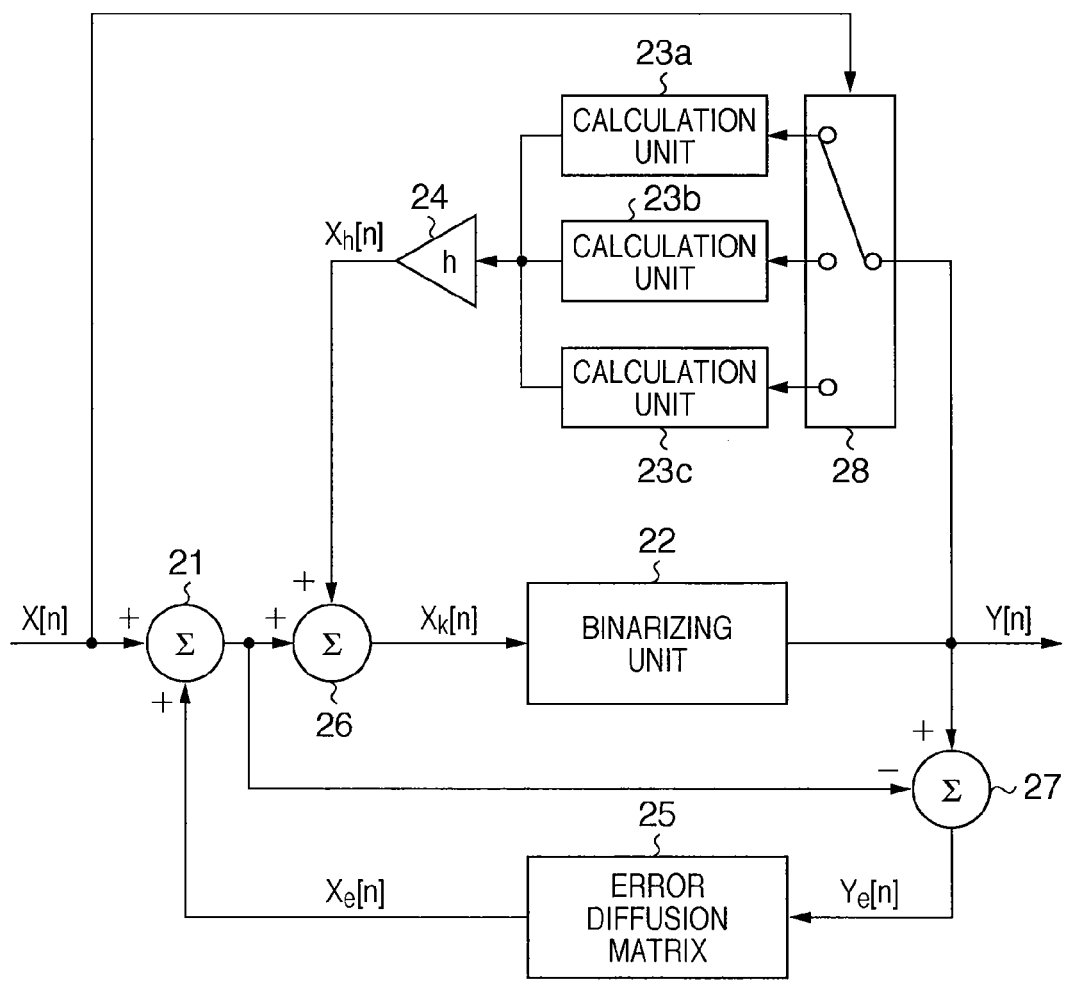
FIG. 29 is a block diagram showing the arrangement of a binarizing processor according to the third embodiment.

FIG. 29 is a block diagram showing the arrangement of a binarizing processor 33 according to the third embodiment.

Figures 30, 31:
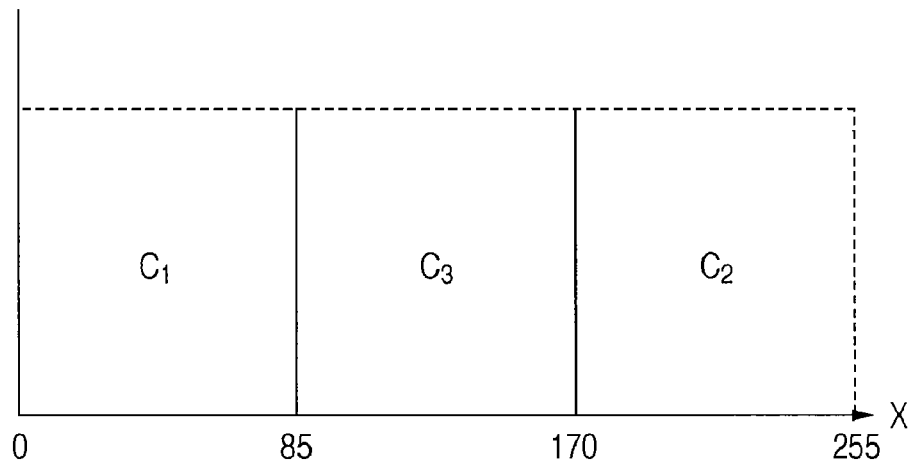
FIG. 30 is a view showing the relationship between reference pixels and reference intensities.
FIG. 31 is a view showing the relationship between calculation units to be selected by a control unit and data of a pixel of interest.

A control unit 28 selects one of calculation units 23a to 23c based on data of a pixel of interest. FIG. 30 is a view showing the relationship between reference pixels and reference intensities. FIG. 31 is a view showing the relationship between the calculation units 23a to 23c to be selected by the control unit 28 and data of the pixel of interest. That is, the control unit 28 selects one of the calculation units 23a to 23c according to rule (7) described by:

refer to data X of pixel of interest;

if($0 \leq X < 85$) select calculation unit 23a (C1); else if
($85 \leq X < 170$) select calculation unit 23c (C3);
else select calculation unit 23b (C2); (7)

Figure 32A:
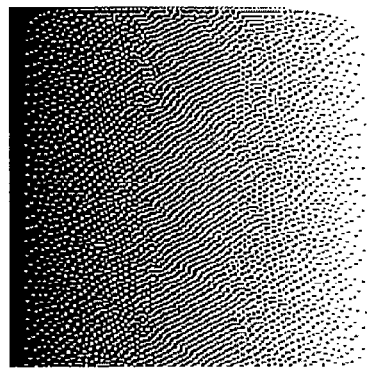
FIGS. 32A to 32C are views for explaining image quality differences due to different calculation units.
Figure 32B:
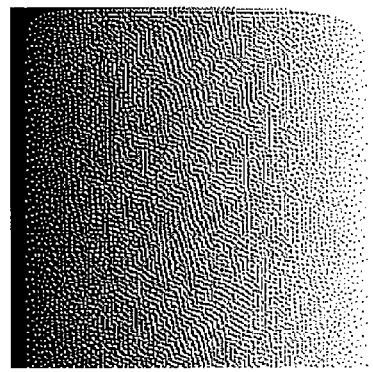
Figure 32C:
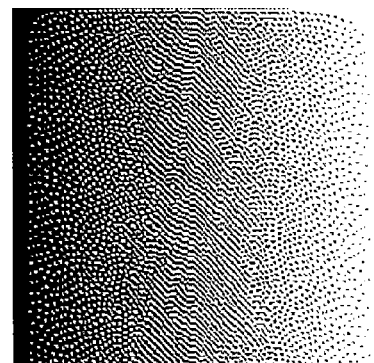

FIGS. 32A to 32C are views for explaining image quality differences due to differences of the calculation units 23a to 23c.

FIG. 32A shows a case in which the calculation unit 23a (C1) is selected, and a satisfactory grayscale image can be obtained in a shadow region $0 \leq X < 85$. However, a texture structure due to parallel line-like patterns is generated in other density regions.

FIG. 32B shows a case in which the calculation unit 23c (C3) is selected, the number of reference pixels is as many as six, and a satisfactory grayscale image can be obtained in an intermediate density region 85≦X<170. However, cluster dots are too fine in other density regions.

FIG. 32C shows a case in which the calculation unit 23b (C2) is selected, and random cluster dot patterns appear in a highlight region 170≦X≦255.

That is, the relationships between the layouts of reference pixels and reference intensities (to be referred to as reference pixel matrices hereinafter) respectively include optimal density regions, and one reference pixel matrix cannot cover the whole density region. By combining a plurality of reference pixel matrices, an optimal grayscale image can be obtained in the whole density region. Therefore, by switching the reference pixel matrices in accordance with the data of the pixel of interest, a satisfactory grayscale image can be obtained in the whole density region.

Figure 33:
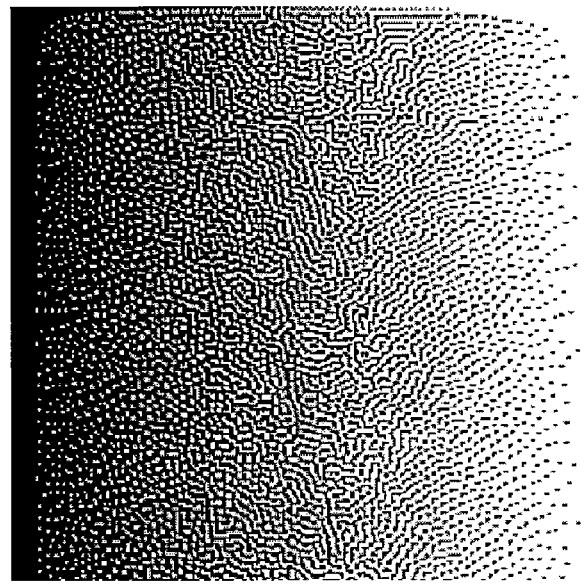
FIG. 33 is a view showing the binarization result of the grayscale image shown in FIG. 5 by a green noise method according to rule (7).
Figure 34:
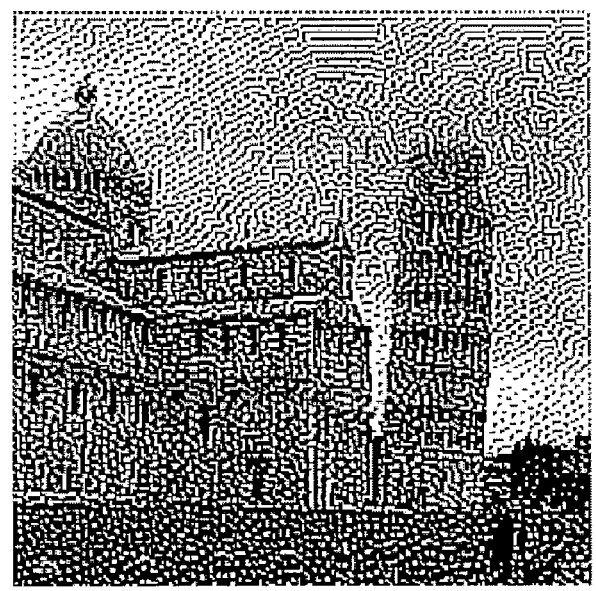
FIG. 34 is a view showing the binarization result of a photo image by a green noise method according to the third embodiment.

FIG. 33 is a view showing the binarization result of the grayscale image shown in FIG. 5 by the green noise method according to rule (7) using the gain coefficient h=0.4. Compared to the output image shown in FIG. 21, parallel line-like patterns in the intermediate density region disappear, and the image quality further improves. FIG. 34 is a view showing the binarization result of a photo image by the green noise method of the third embodiment, and indicates that a satisfactory output image can be obtained even for the photo image.

According to the aforementioned embodiments, the spatial frequency suited to the electrophotography system is held, a stable cluster halftone screen can be output, and generation of moiré can be suppressed. As a result, in digital printing of the electrophotography system such as a copying machine, MFP, and office printer, a high-quality image in which moiré is suppressed can be stably output.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-096559, filed Apr. 2, 2008, which is hereby incorporated by reference herein in its entirety.

What is claimed is:

1. An image processing apparatus comprising:
a quantizing section, configured to quantize an input image in a pixel unit;
a generator, configured to generate first reference data and second reference data by reference quantized pixels close to a pixel of interest; and
an adder, configured to add an additional value based on one of the first reference data and the second reference data to a value of the pixel of interest,
wherein the first reference data is generated from a first pixel set which contains quantized pixels close to the pixel of interest, the second reference data is generated from a second pixel set which contains quantized pixels close to the pixel of interest, and a pixel arrangement of the second pixel set is different from that of the first pixel set, and
wherein the quantizing section quantizes the pixel of interest of which the additional value is added to the value using an error diffusion method.

2. The apparatus according to claim 1, wherein the adder selects the first or second reference data in accordance with a data pattern of the quantized pixels close to the pixel of interest.

3. The apparatus according to claim 1, wherein the adder selects the first or second reference data in accordance with an input value corresponding to the pixel of interest.

4. The apparatus according to claim 1, wherein the generator further generates third reference data from a third pixel set which contains quantized pixels close to the pixel of interest, wherein a pixel arrangement of the third pixel set is different from those of the first and second pixel sets, and a number of the quantized pixels contained in the third pixel set is lager than those in the first and second pixel sets,
wherein the adder selects one of the first to third reference data as the reference data for the pixel of interest, and
wherein, if an input value corresponding to the pixel of interest represents an intermediate density region, the adder selects the third reference data.

5. An image processing method comprising:
using a processor to perform the steps of:
quantizing an input image in a pixel unit;
generating first reference data and second reference data by reference quantized pixels close to a pixel of interest; and
adding an additional value based on one of the first reference data or the second reference data to a value of the pixel of interest,
wherein the first reference data is generated from a first pixel set which contains quantized pixels close to the pixel of interest, the second reference data is generated from a second pixel set which contains quantized pixels close to the pixel of interest, and a pixel arrangement of the second pixel set is different from that of the first pixel set, and wherein, in the quantizing step, the pixel of interest of which the additional value is added to the value is quantized using an error diffusion method.

6. A non-transitory computer-readable medium storing a computer-executable program for causing a computer to perform an image processing method, the method comprising the steps of:

quantizing an input image in a pixel unit;

generating first reference data and second reference data by reference quantized pixels close to a pixel of interest; and adding an additional value based on one of the first reference data and the second reference data to a value of the pixel of interest, wherein the first reference data is generated from a first pixel set which contains quantized pixels close to the pixel of interest, the second reference data is generated from a second pixel set which contains quantized pixels close to the pixel of interest, and a pixel arrangement of the second pixel set is different from that of the first pixel set, and wherein, in the quantizing step, the pixel of interest of which the additional value is added to the value is quantized using an error diffusion method.

* * * * *